(12) United States Patent
Choung et al.

(10) Patent No.: US 11,993,024 B2
(45) Date of Patent: May 28, 2024

(54) DEVICE FOR ATTACHING PROTECTION FILM OF ELECTRONIC DEVICE AND METHOD FOR ATTACHING PROTECTION FILM USING SAME

(71) Applicant: Samsung Electronics Co., Ltd., Suwon-si (KR)

(72) Inventors: Taedoo Choung, Suwon-si (KR); Minjung Kim, Suwon-si (KR); Younggyun Kim, Suwon-si (KR); Jeeyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 16/959,845

(22) PCT Filed: Feb. 14, 2019

(86) PCT No.: PCT/KR2019/001846
§ 371 (c)(1),
(2) Date: Jul. 2, 2020

(87) PCT Pub. No.: WO2019/168285
PCT Pub. Date: Sep. 6, 2019

(65) Prior Publication Data
US 2020/0368974 A1    Nov. 26, 2020

(30) Foreign Application Priority Data
Feb. 28, 2018    (KR) .................. 10-2018-0024747

(51) Int. Cl.
*B29C 65/14*    (2006.01)
*B29C 65/80*    (2006.01)
(Continued)

(52) U.S. Cl.
CPC .......... *B29C 65/1406* (2013.01); *B29C 65/80* (2013.01); *G02B 1/14* (2015.01);
(Continued)

(58) Field of Classification Search
CPC .............. G02B 1/14; G02B 1/18; B29C 65/14
See application file for complete search history.

(56) References Cited

U.S. PATENT DOCUMENTS 5,656,306 A    8/1997  Makiguchi
10,473,832 B2  11/2019 Wu et al.
(Continued)

FOREIGN PATENT DOCUMENTS

CN    1239585 A    12/1999
CN    2803684 Y    8/2006
(Continued)

OTHER PUBLICATIONS

Machine translation JP3182202U (Year: 2013).*
(Continued)

*Primary Examiner* — Jacob T Minskey
*Assistant Examiner* — Wayne K. Swier
(74) *Attorney, Agent, or Firm* — Jefferson IP Law, LLP

(57) ABSTRACT

Various embodiments introduce a device for attaching a protection film, the device comprising: a fixing tray including a seating portion on which an electronic device is stably placed; a base portion including a coupling portion to allow the fixing tray to be attached to or detached from the base portion and at least one rail formed along the longitudinal direction or the width direction of the coupling portion; a roller portion which moves along the at least one rail and presses a surface of the electronic device stably placed on the fixing tray; and a hardening portion coupled to the base portion, closing or opening the seating portion of the fixing
(Continued)

tray, and emitting ultraviolet rays toward the fixing tray. Other embodiments are also possible.

14 Claims, 22 Drawing Sheets

(51) Int. Cl.
*B29L 31/34* (2006.01)
*G02B 1/14* (2015.01)
*G02B 1/18* (2015.01)
*G06F 1/16* (2006.01)

(52) U.S. Cl.
CPC ............. *G02B 1/18* (2015.01); *G06F 1/1609* (2013.01); *B29L 2031/3475* (2013.01)

(56) References Cited

U.S. PATENT DOCUMENTS

| | | | |
|---|---|---|---|
| 10,684,655 | B2 | 6/2020 | Park et al. |
| 2006/0237141 | A1 | 10/2006 | Cheng |
| 2013/0168010 | A1 | 7/2013 | Jung et al. |
| 2014/0124146 | A1 | 5/2014 | Patel et al. |
| 2015/0064064 | A1* | 3/2015 | Kim .................. A61L 2/10 250/492.1 |
| 2016/0059531 | A1 | 3/2016 | Zhang et al. |
| 2018/0024594 | A1 | 1/2018 | Park et al. |
| 2018/0104943 | A1 | 4/2018 | Chen et al. |
| 2018/0281373 | A1 | 10/2018 | Lin |
| 2018/0356570 | A1 | 12/2018 | Wu et al. |
| 2019/0047815 | A1 | 2/2019 | Kim |
| 2019/0235580 | A1 | 8/2019 | Park et al. |
| 2019/0239372 | A1 | 8/2019 | Park et al. |
| 2020/0089283 | A1 | 3/2020 | Park et al. |

FOREIGN PATENT DOCUMENTS

| | | | | |
|---|---|---|---|---|
| CN | 202923909 | U | 5/2013 | |
| CN | 103192579 | A | 7/2013 | |
| CN | 203345234 | U | 12/2013 | |
| CN | 203842768 | U | 9/2014 | |
| CN | 104890336 | A | 9/2015 | |
| CN | 204642232 | U | 9/2015 | |
| CN | 204750661 | A | 11/2015 | |
| CN | 204750661 | U | 11/2015 | |
| CN | 105438531 | A | 3/2016 | |
| CN | 105513500 | A | 4/2016 | |
| CN | 206085795 | U | 4/2017 | |
| CN | 106985487 | A | 7/2017 | |
| CN | 106986056 | A | 7/2017 | |
| CN | 107235180 | A | 10/2017 | |
| CN | 107344636 | A | 11/2017 | |
| CN | 206606393 | U | 11/2017 | |
| CN | 107433752 | A | 12/2017 | |
| CN | 207000898 | U | 2/2018 | |
| JP | H09-76341 | A | 3/1997 | |
| JP | 2009-285597 | A | 12/2009 | |
| JP | 2012-099606 | A | 5/2012 | |
| JP | 3182202 | U | 3/2013 | |
| JP | 2016-049742 | A | 4/2016 | |
| JP | 6159451 | B1 | 7/2017 | |
| KR | 10-1316640 | B1 | 10/2013 | |
| KR | 10-2015-0126271 | A | 11/2015 | |
| KR | 20160039070 | A * | 4/2016 | ............... A61L 2/10 |
| KR | 10-2017-0035645 | A | 3/2017 | |
| KR | 10-1718084 | B1 | 5/2017 | |
| KR | 10-1791831 | B1 | 10/2017 | |
| KR | 10-2017-0141416 | A | 12/2017 | |
| KR | 10-2018-0009586 | A | 1/2018 | |
| KR | 10-1833257 | B1 | 4/2018 | |
| TW | M547122 | U | 8/2017 | |
| WO | WO-2014021486 | A1 * | 2/2014 | ............. B29C 63/02 |
| WO | 2017/126796 | A1 | 7/2017 | |
| WO | 2018/006533 | A1 | 1/2018 | |

OTHER PUBLICATIONS

Machine translation CN204750661U (Year: 2015).*
Machine translation KR20160039070A (Year: 2016).*
Definition of rubber as elastic material dictionary.com https://www.dictionary.com/browse/rubber. (Year: 2016).*
Machine translation CN107235180A (Year: 2017).*
Machine translation CN207000898U (Year: 2018).*
Machine translation KR101316640 (Year: 2013).*
Machine Translation WO2014021486A1 (Year: 2014).*
Machine translation KR20170035645A (Year: 2015).*
Chinese Office Action dated May 6, 2023, issued in Chinese Application No. 202210540061.1.
Vietnamese Office Action dated Jun. 12, 2023, issued in Vietnamese Application No. 1-2020-04054.
Extended European Search Report dated Dec. 18, 2020, issued in European Application No. 19760596.7-1014 / 3718752 PCT/KR2019001846.
Korean Office Action dated May 22, 2020, issued in Korean Application No. 10-2018-0024747.
Chinese Office Action dated Aug. 6, 2021, issued in Chinese Application No. 201980007612.4.
Indian Notice of Hearing dated Aug. 11, 2023; Indian Appln. No. 202017026776.
Chinese Notification of Patent Grant with English translation dated Nov. 20, 2023; Chinese Appln. No. 202210540061.1.

* cited by examiner

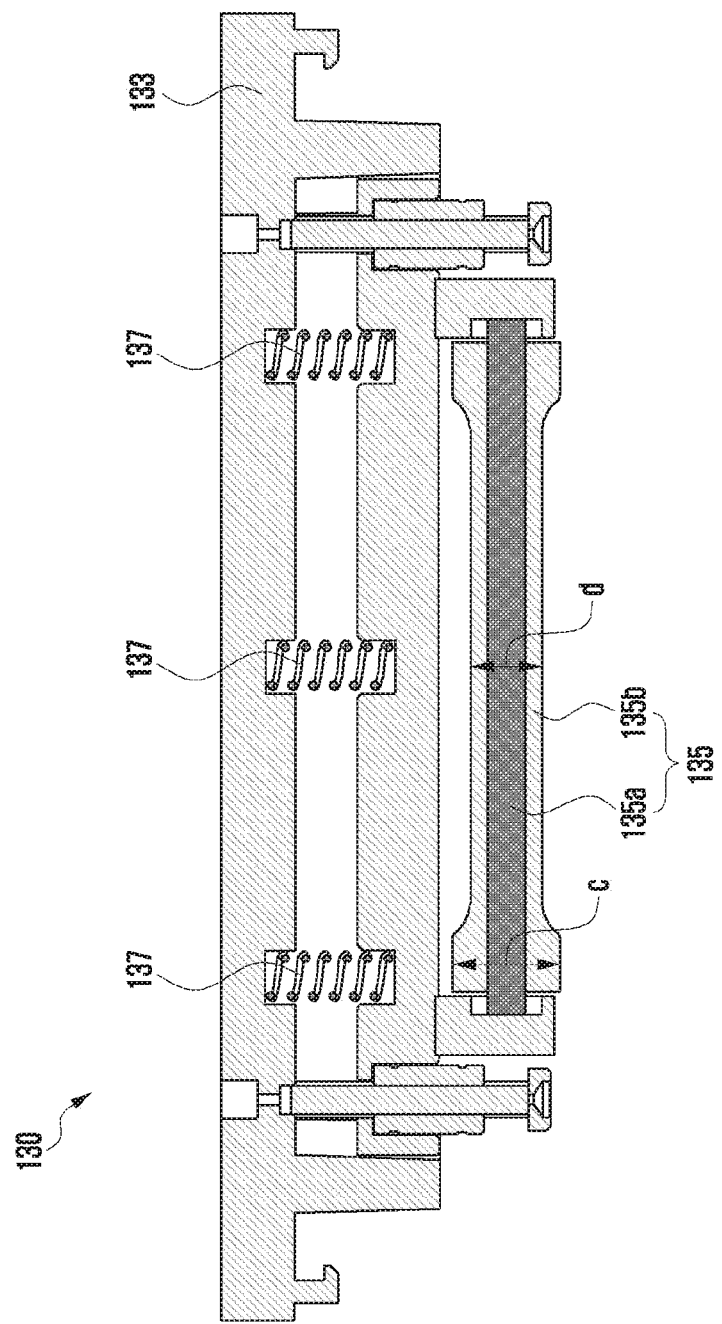

DEVICE FOR ATTACHING PROTECTION FILM OF ELECTRONIC DEVICE AND METHOD FOR ATTACHING PROTECTION FILM USING SAME

TECHNICAL FIELD

Various embodiments of the disclosure relate to a device for attaching a protective film to an electronic device. In particular, various embodiments relate to a protective film attachment device capable of uniformly attaching a protective film to a curved surface of an electronic device without distortion.

BACKGROUND ART

A protective film may be used in order to prevent the occurrence of scratches on the surface of an electronic device or to prevent damage to the surface of the electronic device when the electronic device is dropped. Research is being conducted on a device for quickly attaching a protective film to the surface of an electronic device without causing distortion or generating bubbles.

DISCLOSURE OF INVENTION

Technical Problem

Conventional protective film attachment devices are capable of attaching a protective film on a flat surface of an electronic device, but are not capable of attaching a protective film on a surface of an electronic device that is curved or a surface of the electronic device that is coated with an anti-fingerprint (AF) coating.

A protective film attached to a curved surface of an electronic device or a surface of an electronic device coated with an AF coating is applied with an adhesive having high adhesive strength. With conventional protective film attachment devices, it is impossible to accurately attach such a protective film without trapping air bubbles thereunder.

According to various embodiments of the disclosure, it is possible to provide a device capable of quickly attaching a protective film on a surface of an electronic device without causing distortion of the protective film or trapping air bubbles under the protective film. In particular, it is possible to provide a protective film attachment device that is capable of quickly and accurately attaching a protective film even on a curved surface of an electronic device, and that is also capable of providing an ultraviolet-curing function such that the shape of the protective film can be maintained to correspond to the curved surface of the electronic device.

Solution to Problem

A protective film attachment device according to an embodiment of the disclosure may include: a fixing tray including a seating portion on which an electronic device is seated; a base including a coupling portion so as to allow the fixing tray to be attached to or detached from the base and rails disposed along a lengthwise direction or a widthwise direction of the coupling portion; a roller unit configured to move along the rails and to press a surface of the electronic device seated on the fixing tray; and a curing unit hinged to the base and configured to close or open the seating portion of the fixing tray and to emit ultraviolet rays towards the fixing tray.

A protective film attachment device according to an embodiment of the disclosure may include: a fixing tray including a seating portion on which an electronic device having a curved surface is seated; a base including a coupling portion so as to allow the fixing tray to be attached to or detached from the base and rails disposed along a lengthwise direction or a widthwise direction of the fixing tray; a roller unit configured to move along the rails and to press the surface of the electronic device seated on the fixing tray; and a curing unit hinged to the base and configured to close or open the seating portion of the fixing tray and to emit ultraviolet rays towards the fixing tray.

A protective film attachment method according to an embodiment of the disclosure may include operations of: coupling the fixing tray to the coupling portion of the base; coupling the roller unit to the base; seating an electronic device on the fixing tray; removing a release paper from one side of a protective film; fixing the protective film to a first fixing portion and a second fixing portion in the state in which the one side of the protective film, from which the release paper has been removed, faces the electronic device; moving the roller unit along the rails of the base; and removing a release paper from the other side of the protective film.

Advantageous Effects of Invention

According to various embodiments of the disclosure, it is possible to quickly and accurately attach a protective film to a curved surface of an electronic device.

With the protective film attachment device according to various embodiments of the disclosure, it is possible to secure attachment force of a protective film even on a curved portion of a surface of an electronic device by curing the protective film on the electronic device simultaneously when attaching the protective film to the electronic device.

BRIEF DESCRIPTION OF DRAWINGS

FIGS. 5A to 5C are views illustrating a roller unit according to an embodiment of the disclosure;

MODE FOR THE INVENTION

Figure 1:
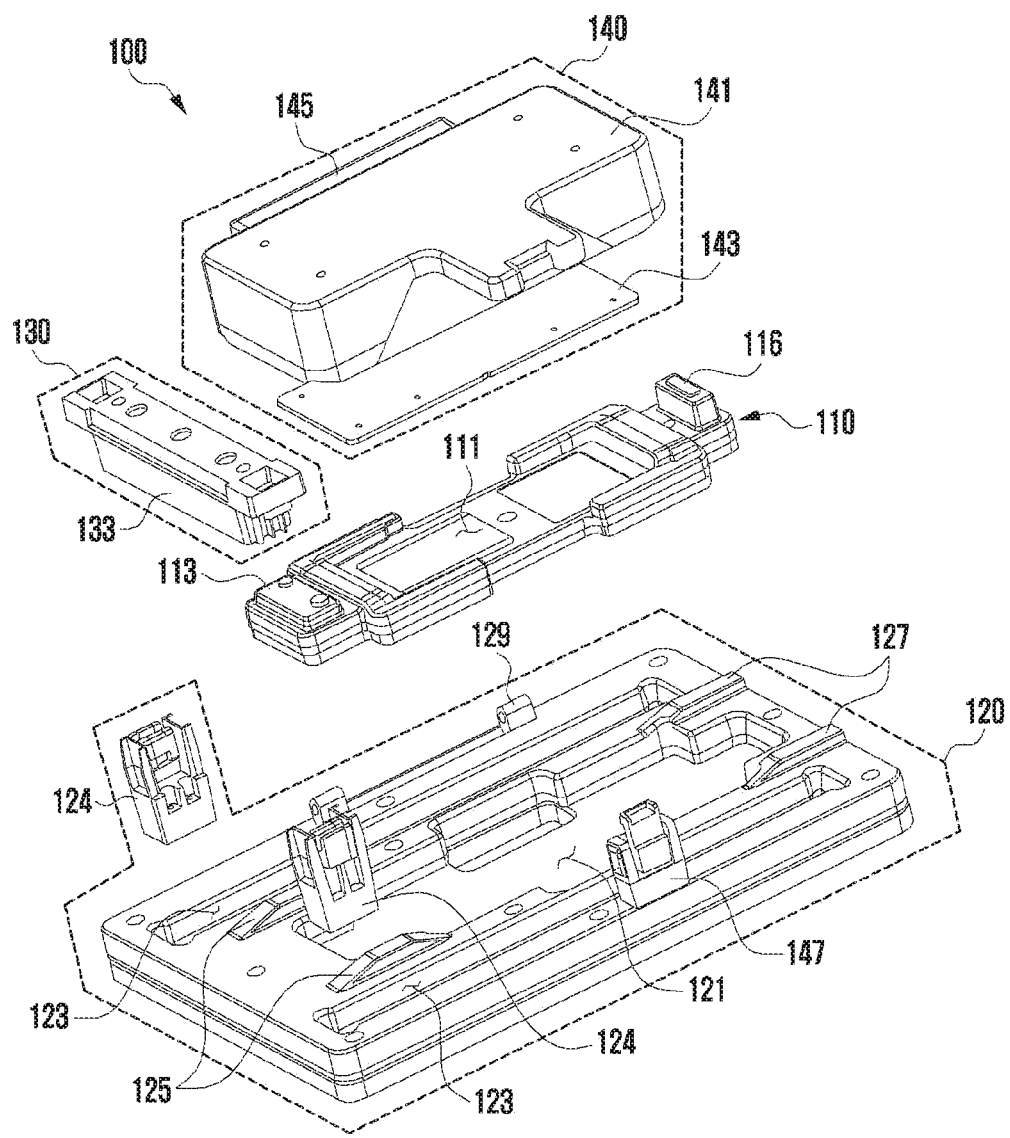
FIG. 1 is an exploded perspective view illustrating a protective film attachment device according to an embodiment of the disclosure.
Figure 2:
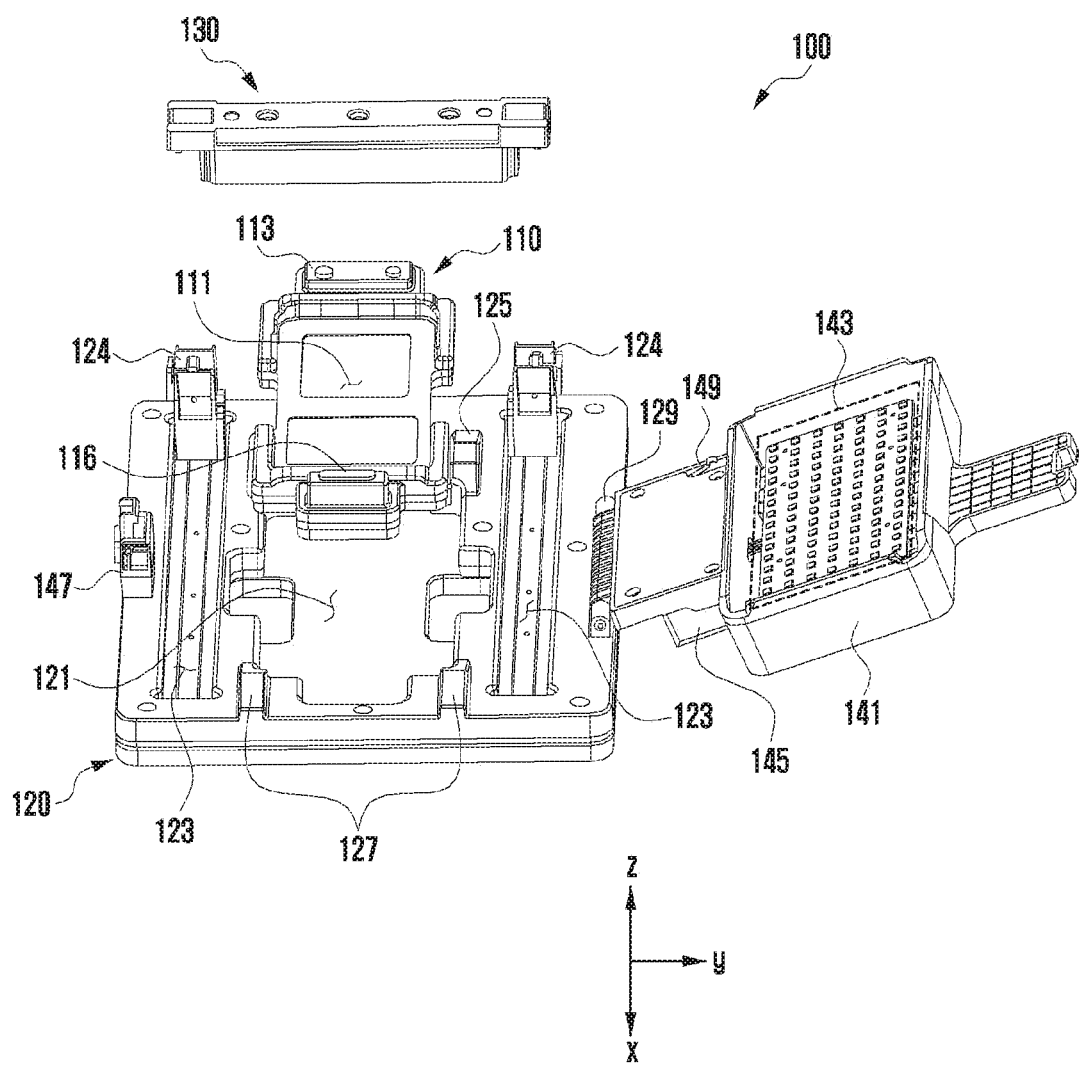
FIG. 2 is an exploded perspective view illustrating the protective film attachment device according to an embodiment of the disclosure when viewed from a different angle.

FIG. 1 is an exploded perspective view illustrating a protective film attachment device 100 according to an embodiment of the disclosure, and FIG. 2 is a view illustrating the protective film attachment device according to an embodiment of the disclosure when viewed from a different angle.

Referring to FIGS. 1 and 2, the protective film attachment device 100 according to an embodiment of the disclosure may include a fixing tray 110, a base 120, a roller unit 130, and a curing unit 140.

In the description of the protective film attachment device 100 according to an embodiment of the disclosure, the lengthwise direction (e.g., the X-axis direction) may be the direction in which the length of the base 120 is long, and the widthwise direction (e.g., the Y-axis direction) may be the direction in which the length of the base 120 is short. For example, a description that the rails 123 are formed in the lengthwise direction (e.g., the X-axis direction) may mean that the rails 123 are formed along the long edges of the base 120.

In the description of the protective film attachment device 100 according to an embodiment of the disclosure, the same components may be described while being assigned with the same reference numerals. In describing the disclosure with reference to each drawing, redundant descriptions will be avoided where possible, and differences will be mainly described.

The fixing tray 110 according to an embodiment of the disclosure may include a seating portion 111, a first fixing portion 113, and a second fixing portion 116. An electronic device 200 (see FIG. 3A) may be seated on the seating portion 111, and a protective film 300 (see FIG. 3B) may be mounted on the first fixing portion 113 and the second fixing portion 116. The relative position between the electronic device 200 and the protective film 300 can be uniformly fixed through the seating portion 111, the first fixing portion 113, and the second fixing portion 116 so as to stably attach the protective film 300. The fixing tray 110 is formed to be detachable from the base 120 to be described later, and the shape of the seating portion 111 may be formed differently depending on the shape of the electronic device 200.

The base 120 according to an embodiment of the disclosure may include a coupling portion 121, rails 123, first ridges 125, second ridges 127, and roller mounts 124 disposed thereon. The coupling portion 121 may be formed such that the fixing tray 110 can be detachably mounted thereon. The rails 123 may be disposed along the lengthwise direction (e.g., the X-axis direction) of the coupling portion 121, and may be disposed parallel to each other, with the coupling portion 121 interposed therebetween.

The first ridges 125 according to an embodiment of the disclosure may be formed to protrude from the base 120, and may be disposed side by side in the widthwise direction (e.g., the Y-axis direction) of the coupling portion 121 such that a portion corresponding to the position of the first fixing portion 113 in the coupling portion 121 is interposed therebetween. The first ridges 125 may be formed such that the degree of protrusion gradually increases and then decreases towards the coupling portion 121 along the lengthwise direction of the base 120 (e.g., the X-axis direction). The height of the maximally protruding portions of the first ridges 125 may correspond to the height of the protruding portion of the first fixing portion 113.

The second ridges 127 according to an embodiment of the disclosure may be formed to protrude from the base 120, and may be disposed side by side in the widthwise direction of the coupling portion 121 (e.g., the Y-axis direction) such that a portion corresponding to the position of the second fixing portion 116 in the coupling portion 121 is located therebetween. The second ridges 127 may be formed such that the degree of protrusion gradually increases in the lengthwise direction (e.g., the X-axis direction) away from the coupling portion 121 and then becomes constant, and the height of the maximally protruding portions of the second ridges 127 may correspond to the height of the protruding portion of the second fixing portion 116.

The roller mounts 124 according to an embodiment of the disclosure are movable along the rails 123.

Figure 5A:
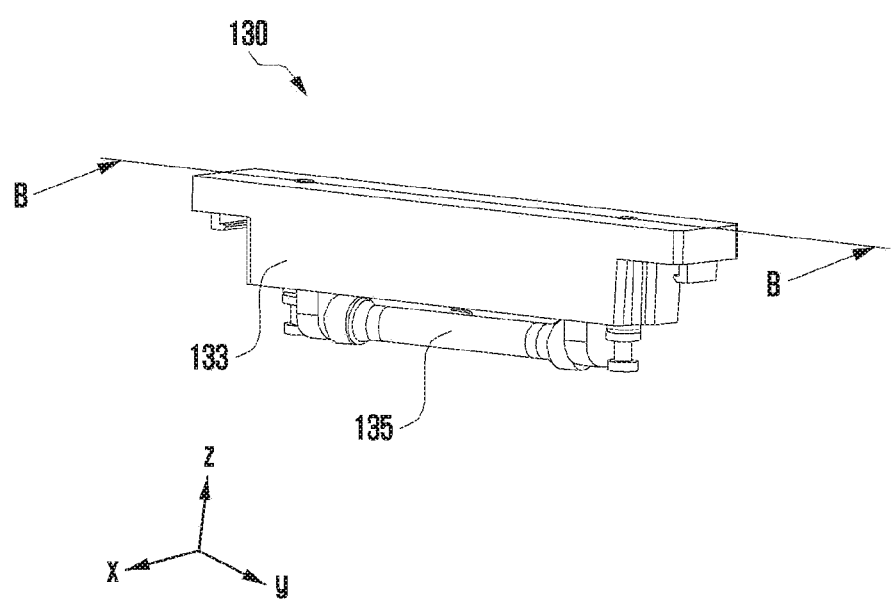
Figure 5B:
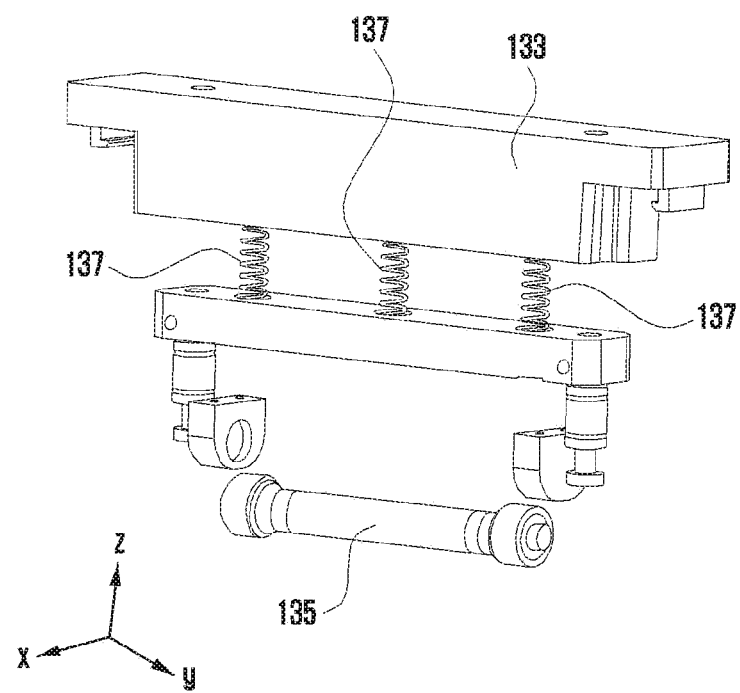

The roller unit 130 according to an embodiment of the disclosure may include a roller housing 133 (see FIG. 5B), a roller 135 (see FIG. 5B), and a roller-pressing unit 137 (see FIG. 5B). The roller unit 130 may be variously formed depending on the shape of the surface of the electronic device 200 mounted on the fixing tray 110 (e.g., a curved surface shape of a window, based on a cross section of the electronic device (see FIG. 10D)).

The curing unit 140 according to an embodiment of the disclosure may include a lamp housing 141 and a power source housing 145. The lamp housing 141 may be formed to correspond to the size of the seating portion 111 of the fixing tray 110, and a light source 143 capable of emitting ultraviolet rays towards the seating portion 111 may be disposed in the lamp housing 141. The power source housing 145 may be coupled through the base 120 and the hinge 129, and may connect the base 120 and the lamp housing 141. The power source housing 145 may be electrically connected to a power source, and a controller and a circuit board for controlling whether to supply power to a plurality of light sources 143 may be disposed in the power source housing 145.

FIGS. 3A to 3E are views illustrating a fixing tray and a protective film according to an embodiment of the disclosure.

Figure 3A:
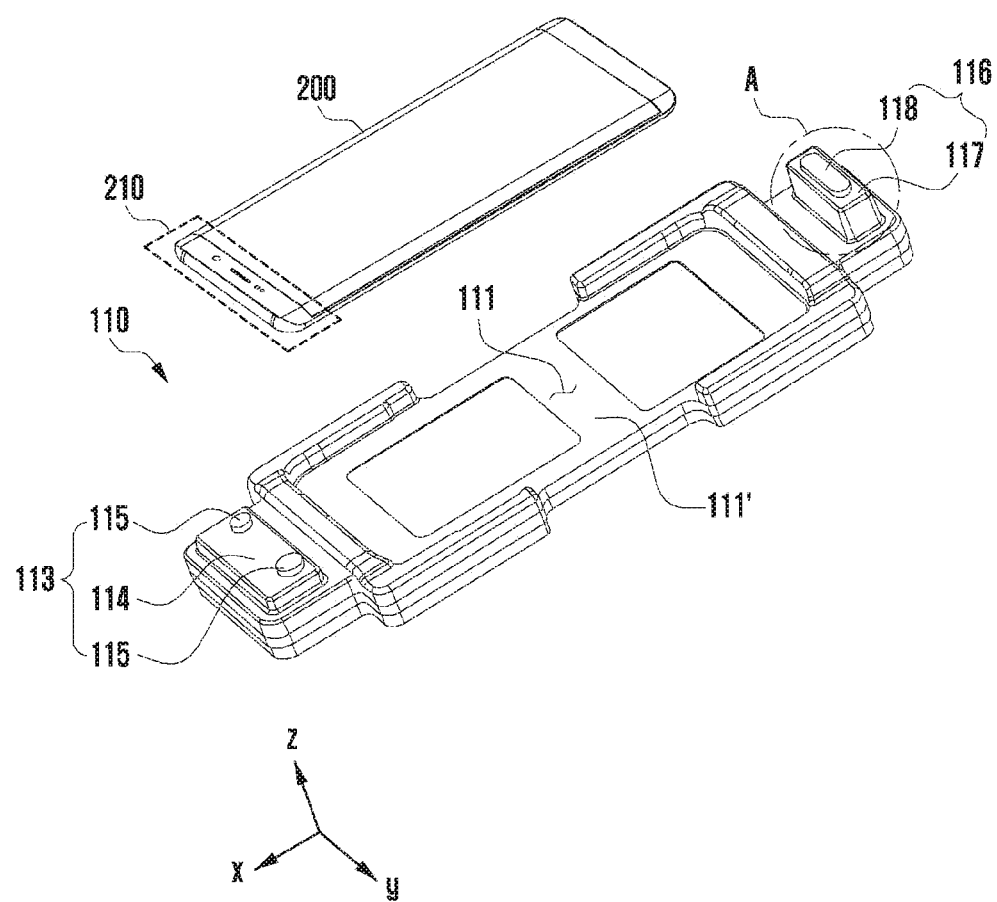
FIGS. 3A to 3E are views illustrating a fixing tray and a protective film according to an embodiment of the disclosure.

FIG. 3A is a view illustrating a fixing tray 110 according to an embodiment of the disclosure.

Referring to FIG. 3A, the fixing tray 110 according to an embodiment of the disclosure may include a seating portion 111, a first fixing portion 113, and a second fixing portion 116.

The fixing tray 110 according to an embodiment of the disclosure has a plate shape having a predetermined thickness, and the central portion thereof is depressed so as to form the seating portion 111. The seating portion 111 may be formed to correspond to the shape of the front surface on which the display of the electronic device 200 is exposed, or the rear surface facing away from the front surface. When the electronic device 200 is seated on the seating portion 111, the upper, lower, left, and right positions of the electronic device 200 may be fixed. The bottom surface 111' of the seating portion 111 may be recessed to correspond to the shape of an electronic component (e.g., a camera or a flash) formed to protrude from the front surface or the rear surface of the electronic device 200.

The fixing tray 110 according to an embodiment of the disclosure may include a first fixing portion 113 and a second fixing portion 116, with the seating portion 111 interposed therebetween. FIG. 3A illustrates the first fixing portion 113 and the second fixing portion 116, which are disposed in the lengthwise direction (e.g., the X-axis direction), with the seating portion 111 interposed therebetween, as an example, but the first fixing portion 113 and the second fixing portion 116 may be formed in the widthwise direction (e.g., the Y-axis direction).

The first fixing portion 113 and the second fixing portion 116 according to an embodiment of the disclosure may serve to fix a protective film 300, which is to be attached to the electronic device 200, at a constant position relative to the electronic device 200.

Figure 3B:
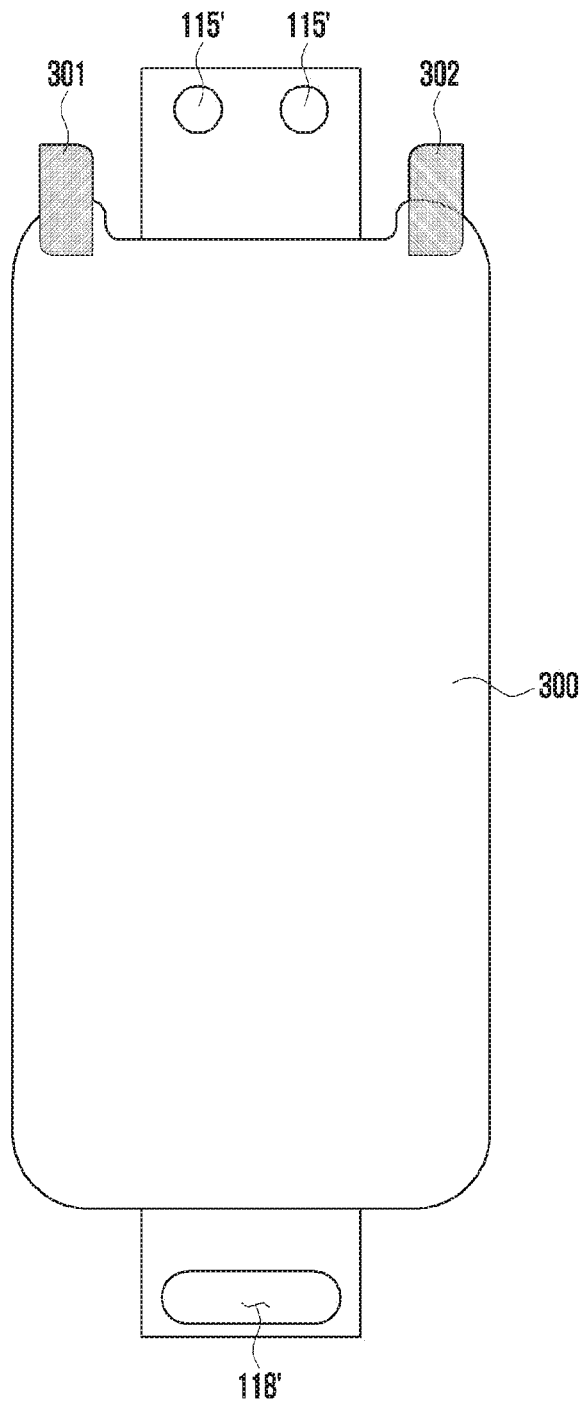
Figure 3C:
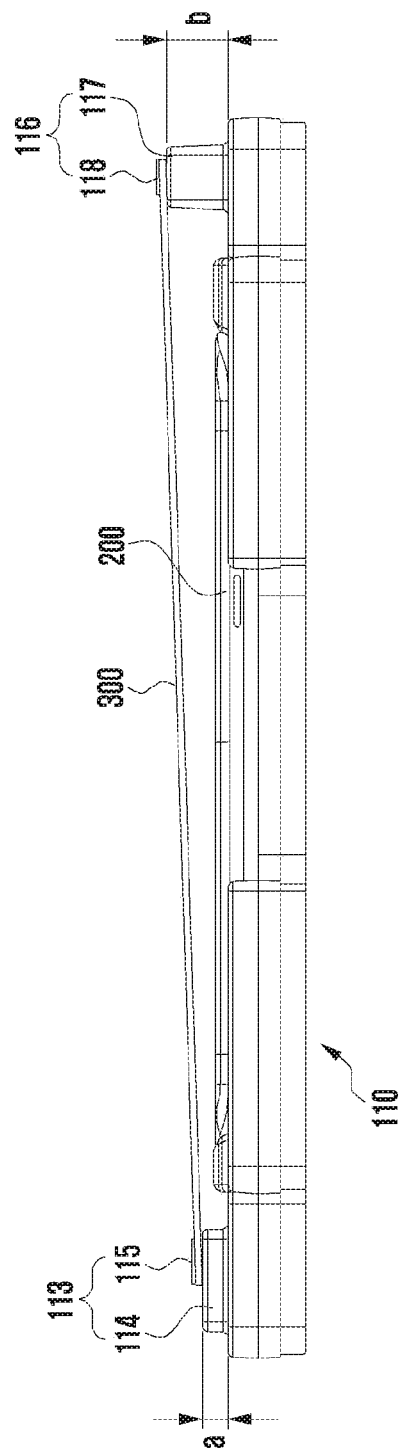

FIG. 3B is a view illustrating the protective film 300 according to an embodiment of the disclosure, and FIG. 3C is a view illustrating the state in which the protective film 300 is seated on the fixing tray 110. Holes 115' and 118' in the protective film 300 illustrated in FIG. 3B may fix the protective film 300 at a position relative to the electronic device 200 by being fitted to the first fixing portion 113 and the second fixing portion 116, as illustrated in FIG. 3C. The protective film 300 according to the embodiment of the disclosure illustrated in FIG. 3B normally maintains a flexible state, but may be cured to thus lose flexibility when exposed to ultraviolet rays.

The protective film 300 according to an embodiment of the disclosure may have release papers attached to one side and the other side thereof. The protective film 300 can be prevented from being contaminated or damaged until it is attached to the electronic device 200. The release paper attached to one side of the protective film 300 may be removed from the protective film 300 together with a first tag 301, and the release paper attached to the other side of the protective film 300 may be removed together with a second tag 302. For example, the release paper removed together with the first tag 301 is able to prevent the surface of the protective film 300 to be attached to the electronic device 200 from being contaminated or damaged, and the release paper removed together with the second tag 302 may prevent the surface of the protective film 300 to be exposed to the outside from being contaminated or damaged.

The first fixing portion 113 according to an embodiment of the disclosure may include a first fixing base 114 and a first fixing protrusion 115. Referring to FIG. 3C, the first fixing base 114 may be formed to protrude by a predetermined height (a) from the surface of the fixing tray 110, and the first fixing protrusion 115 may be formed to protrude by a predetermined height from the first fixing base 114 so as to be inserted into the hole 115' in the protective film 300.

At least two first fixing protrusions 115 according to an embodiment of the disclosure may be formed on the first fixing base 114. The positions of the first fixing protrusions 115 are starting points for attaching the protective film 300 to the electronic device 200, and by arranging two or more first fixing protrusions 115, it is possible to more precisely fix the position of the protective film 300 relative to the electronic device 200. When the electronic device 200 is seated on the fixing tray 110 according to an embodiment of the disclosure, the electronic device 200 may be seated such that the upper end portion 210 of the electronic device, in which a structure exposed to the front surface of the electronic device 200, such as a receiver hole or a front camera, is mainly located, faces the first fixing portions 113. The multiple first fixing protrusions 115 of the first fixing portion 113 are disposed so as to more precisely fix the position of the protective film 300 relative to the electronic device 200 compared to the second fixing protrusion 118 side. Thus, it is possible to seat the electronic device 200 on the fixing tray 110 such that the upper end portion 210 of the electronic device 200 is located on the first fixing portion 113 side.

The second fixing portion 116 according to an embodiment of the disclosure may include a second fixing base 117 and a second fixing protrusion 118. The second fixing base 117 may be formed to protrude by a predetermined height (b) from the surface of the fixing tray 110, and the second fixing protrusion 118 may be formed to protrude by a predetermined height from the second fixing base 117 so as to be inserted into the hole 118' in the protective film 300. The height (b) of the second fixing base 117 may be formed to be higher than the height (a) of the first fixing base 114. Since the height (b) of the second fixing base 117 is formed to be higher than the height (a) of the first fixing base 114, the gap between the surface of the electronic device 200 and the protective film 300 may be narrowed at the first fixing portion 113 side, at which the protective film 300 starts to be attached, and the position of the protective film 300 relative to the electronic device 200 may be more precisely aligned. By securing the gap between the surface of the electronic device 200 and the protective film 300 at the second fixing portion 116 side to which the electronic device 200 and the protective film 300 are attached, the protective film 300 may be guided to be in close contact with and to be attached to the electronic device 200 from the position of the first base 114.

Figure 3D:
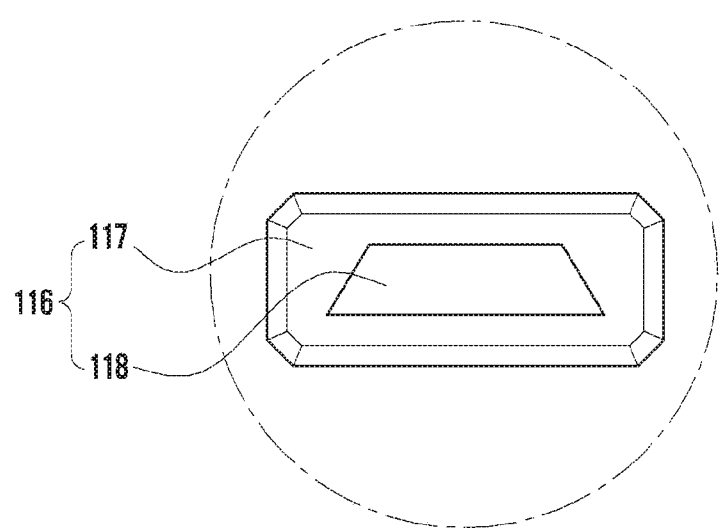
Figure 3E:
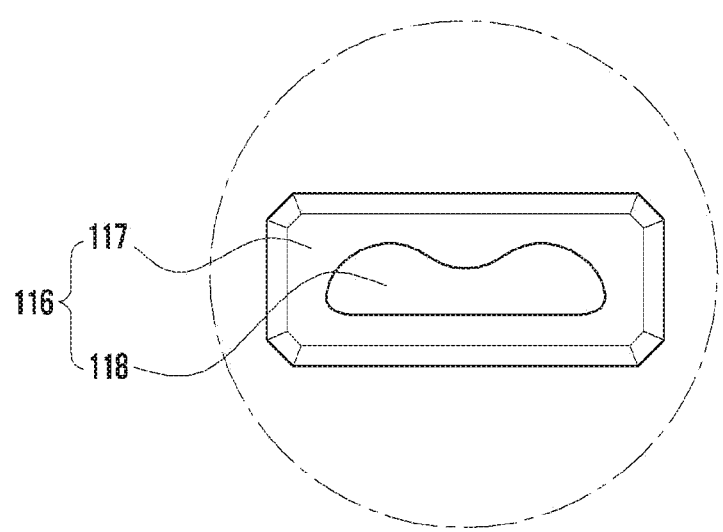

FIGS. 3D and 3E are enlarged views, each illustrating part A in FIG. 3A, centered on the shape of the second fixing portion 116.

The second fixing protrusion 118 according to an embodiment of the disclosure may be formed in an elliptical shape as illustrated in FIG. 3A, or may be formed in a trapezoidal shape or an M-shape as illustrated in FIGS. 3D and 3E. As illustrated in FIGS. 3D and 3E, a shape in which the left and right shapes of the second fixing protrusion 118 spread towards the seating portion 111 (see FIG. 3A) may be advantageous in attaching the protective film to an electronic device.

In the process in which the protective film 300 (see FIG. 3B) is pressed against and attached to the surface of the electronic device 200 (see FIG. 3B) from the first fixing portion 113 (see FIG. 3A) towards the second fixing portion 116 (see FIG. 3A) according to an embodiment of the disclosure, the tension applied to the protective film 300 may increase as the pressed portion approaches the second fixing portion 116. The tension applied to the protective film 300 may cause a phenomenon in which the surface of the protective film 300 is deformed to form wrinkles along the direction in which the tension acts. When the left and right shapes of the second fixing protrusion 118 are formed to spread towards the seating portion 111 (see FIG. 3A) as illustrated in FIG. 3D or FIG. 3E, the direction of the tension acting on the protective film 300 may be induced towards edges rather than towards the center. Even if the protective film 300 is temporarily deformed in a wrinkled form depending on the direction of the tension induced towards the edges, the central portion of the protective film 300 is not wrinkled, and thus the wrinkled portions in the protective film 300 may be unwrinkled again in the process in which the protective film 300 is attached to the surface of the electronic device 200.

Figure 4:
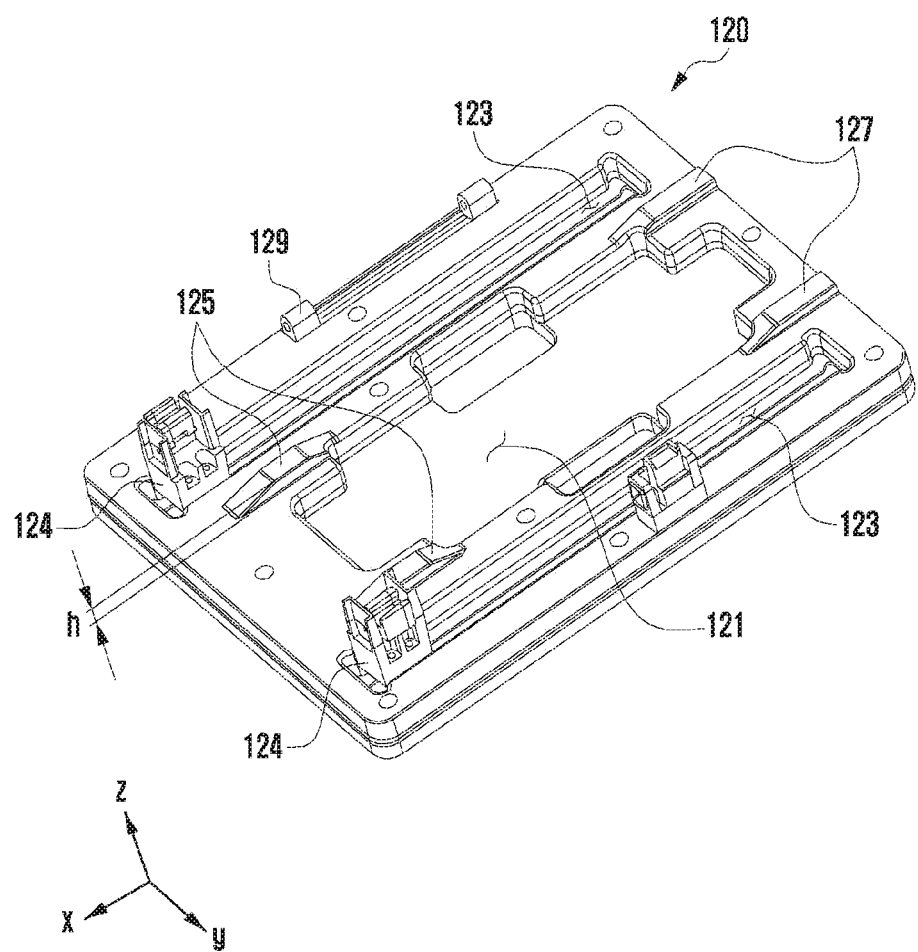
FIG. 4 is a view illustrating a base according to an embodiment of the disclosure.

FIG. 4 is a view illustrating a base 120 according to an embodiment of the disclosure.

The base 120 according to an embodiment of the disclosure may include a coupling portion 121, rails 123, first ridges 125, second ridges 127, and roller mounts 124 disposed thereon.

The base 120 according to an embodiment of the disclosure has the shape of a plate having a predetermined thickness, and the central portion thereof may be depressed so as to form the coupling portion 121. The coupling portion 121 may be formed to correspond to the shape of the fixing tray 110 (see FIG. 3A), and when the fixing tray 110 is coupled to the coupling portion 121, the upper, lower, right, and left positions thereof may be fixed. The coupling portion 121 may be formed such that the fixing tray 110 can be detachably mounted thereon.

Even if the seating portion 111 (see FIG. 3A) of the fixing tray 110 according to an embodiment of the disclosure is variously formed to correspond to the shape of the electronic device 200 (see FIG. 3A), when the shape of the edges of the fixing tray 110 is maintained constant, various electronic devices 200 can be seated on the base 120 by replacing the fixing tray 110.

The rails 123 according to an embodiment of the disclosure may be formed in the lengthwise direction (e.g., the X-axis direction) of the coupling portion 121, and may be disposed parallel to each other, with the coupling portion 121 interposed therebetween. The rails 123 may allow a roller unit 130 (see FIG. 5A) to be described later to move along a predetermined path from the first fixing part 113 (see FIG. 3A) to the second fixing portion 116 (see FIG. 3A) and to uniformly press the protective film against the surface of the electronic device.

The first ridges 125 according to an embodiment of the disclosure may be formed to protrude (h) from the base 120. A pair of first ridges 125 may be disposed side by side in the widthwise direction (e.g., the Y-axis direction) of the coupling portion 121 such that a portion corresponding to the position of the first fixing portion 113 in the coupling portion 121 is interposed therebetween. The distance between the pair of first ridges 125 may correspond to the length of the roller 135 (see FIG. 5B) of the roller unit 130, which will be described later.

The first ridges 125 according to an embodiment of the disclosure may be formed such that the degree of protrusion gradually increases along the lengthwise direction of the base 120 (e.g., the X-axis direction) and then decreases towards the coupling portion 121. The height h of the maximally protruding portions of the first ridges 125 may correspond to the height of the protruding portion of the first fixing portion 113. The height of the protruding portion of the first fixing portion 113 may be the sum of the height (a) of the first fixing base 114 and the height of the first fixing protrusion 115 protruding to a predetermined height. In the process in which the roller unit 130 moves along the rails 123, it is possible to avoid interference with the first fixing portion 113.

The second ridges 127 according to an embodiment of the disclosure may be formed to protrude from the base 120, and may be disposed side by side in the widthwise direction (e.g., the Y-axis direction) of the coupling portion 121 such that a portion corresponding to the position of the second fixing portion 116 in the coupling portion 121 is located therebetween. The second ridges 127 may be formed such that the degree of protrusion gradually increases in the lengthwise direction of the base 120 (e.g., the X-axis direction) away from the coupling portion 121 and then becomes constant, and the height of the maximally protruding portions of the second ridges 127 may correspond to the height of the protruding portion of the second fixing portion 116. The height of the protruding portion of the second fixing portion 116 may be the sum of the height (b) of the second fixing base 117 and the height of the second fixing protrusion 118 protruding to a predetermined height. In the process in which the roller unit 130 moves along the rails 123, it is possible to avoid interference with the second fixing portion 116.

Each roller mount 124 according to an embodiment of the disclosure may be fitted, at one side thereof, to one of the rails 123 of the base 120 so as to move along the rail 123, and the roller housing 133 (see FIG. 5A) may be coupled to the other side of the roller mount 124. The roller mount 124 may allow the roller unit 130 (see FIG. 5A) to move in the state of being spaced apart from the base 120 by a predetermined distance.

FIGS. 5A to 5C are views illustrating a roller unit 130 according to an embodiment of the disclosure.

FIG. 5A is a perspective view of the roller unit 130 according to an embodiment of the disclosure, and FIG. 5B is an exploded perspective view of the roller unit 130 according to an embodiment of the disclosure. FIG. 5C is a cross-sectional view taken along line B-B in FIG. 5A.

The roller unit 130 according to an embodiment of the disclosure may include a roller housing 133, a roller 135, and a roller-pressing unit 137. The roller unit 130 may be variously formed depending on the shape of the surface of the electronic device 200 (see FIG. 3A) mounted on the fixing tray 110 (see FIG. 3A) (e.g., a curved shape of the surface of a window, based on a cross section of the electronic device 200 (see FIG. 10D)), and may be replaced with one corresponding to the fixing tray 110 to be mounted.

The roller housing 133 according to an embodiment of the disclosure may be formed such that the surface facing the base 120 (see FIG. 4) is open. The roller housing 133 may include therein a roller 135 and a roller-pressing unit 137. The roller 135 may come into contact with the surface of the electronic device 200 through the open surface of the roller housing 133.

FIG. 5C is a cross-sectional view taken along line B-B in FIG. 5A. The roller 135 according to an embodiment of the disclosure may be embedded in the roller housing 133, and may move towards or away from the base 120. The roller 135 may include a shaft 135a coupled to the roller housing 133 and an elastic portion 135b surrounding the shaft 135a and coming into contact with the surface of the protective film. According to an embodiment, the shaft 135a and the elastic part 135b surrounding the shaft 135a may be coupled via adhesive.

Referring to FIG. 5C, the roller 135 is formed to have a smaller diameter (d) in the center than the diameter (c) at opposite end portions, and a change in diameter from the opposite end portions of the roller (135) to the center may correspond to the surface shape (see FIG. 10D) of the cross section cut in the lengthwise direction (e.g., the X-axis direction) or in the widthwise direction (e.g., the Y-axis direction). Thereby, it is possible to uniformly press the surface of the electronic device having a three-dimensional shape or a curved surface.

The elastic portion 135b of the roller 135 according to an embodiment of the disclosure may be divided in a direction perpendicular to the lengthwise direction (e.g., the Y-axis direction) of the shaft 135a, and may be formed of materials having different elastic moduli. At least a portion of the elastic portion 135b of the roller 135 may be made of a different material. For example, when a protective film is attached to the rear surface of the electronic device 200, a protruding component such as a camera of the electronic device 200 and the roller 135 may interfere with each other at a position corresponding to the central portion of the roller 135. In this case, when the central portion of the roller 135 is formed of a soft elastic material and the opposite end portions of the roller 135 are formed of an elastic material harder than the central portion, the central portion of the roller 135 is pressed and deformed more than the opposite end portions when the roller 135 passes through the position of the camera of the electronic device 200 and the protruding amount of the camera is absorbed. Thus, the opposite end portions of the roller 135 can uniformly press the remaining surface of the electronic device 200.

In the roller housing 133 according to an embodiment of the disclosure, a roller-pressing unit 137 for performing pressing with a predetermined force may be disposed so as to uniformly press the roller 135 against the surface of the electronic device 200. FIG. 5C illustrates springs as an embodiment of the roller-pressing unit 137, but any device capable of constantly applying a predetermined force, such as a hydraulic cylinder or a pneumatic cylinder, may be used.

Figure 6A:
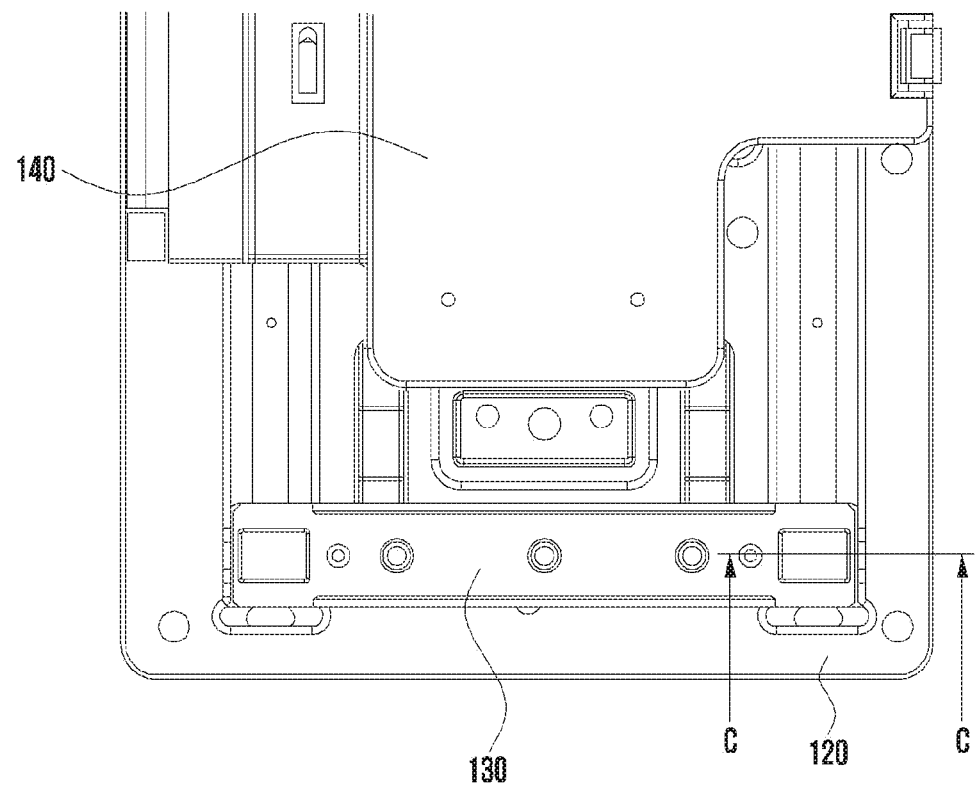
FIGS. 6A and 6B are views illustrating a portion in which the roller housing and the roller mount according to an embodiment of the disclosure are coupled.
Figure 6B:
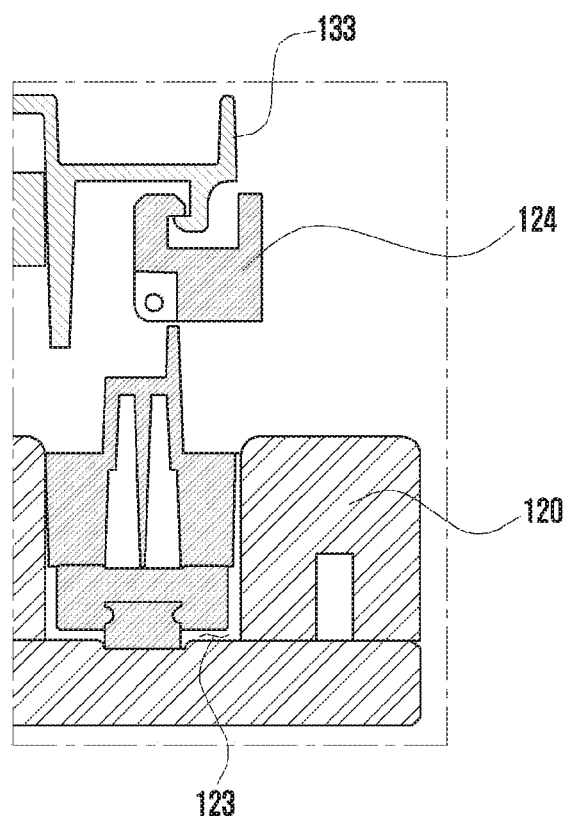

FIGS. 6A and 6B are views illustrating a portion in which the roller housing 133 and the roller mount 124 according to an embodiment of the disclosure are coupled.

FIG. 6A is a plan view illustrating the base 120 and the roller portion 130 according to an embodiment of the disclosure, and FIG. 6B is a cross-sectional view taken along line C-C in FIG. 6A.

The roller housing 133 previously described with reference to FIGS. 5A to 5C may be integrally replaced with the roller 135 (see FIG. 5B) and the roller-pressing unit 137 (see FIG. 5B) embedded in the roller housing 133. Since the roller housing 133 is detachably coupled to the roller mount 124, it is possible to attach a protective film 300 (see FIG. 3B) to the surface of any of various electronic devices 200 by replacing the roller housing 133 with one corresponding to the electronic device 200 (see FIG. 3A) seated on the fixing tray 110 (see FIG. 3A).

FIG. 6B illustrates that the roller housing 133 and the roller mount 124 are latched to each other, as an embodiment. However, any structure capable of implementing detachment/attachment of the roller housing 133 and the roller mount 124, such as coupling using a magnetic body or an electromagnetic force, may be applicable.

Figure 7:
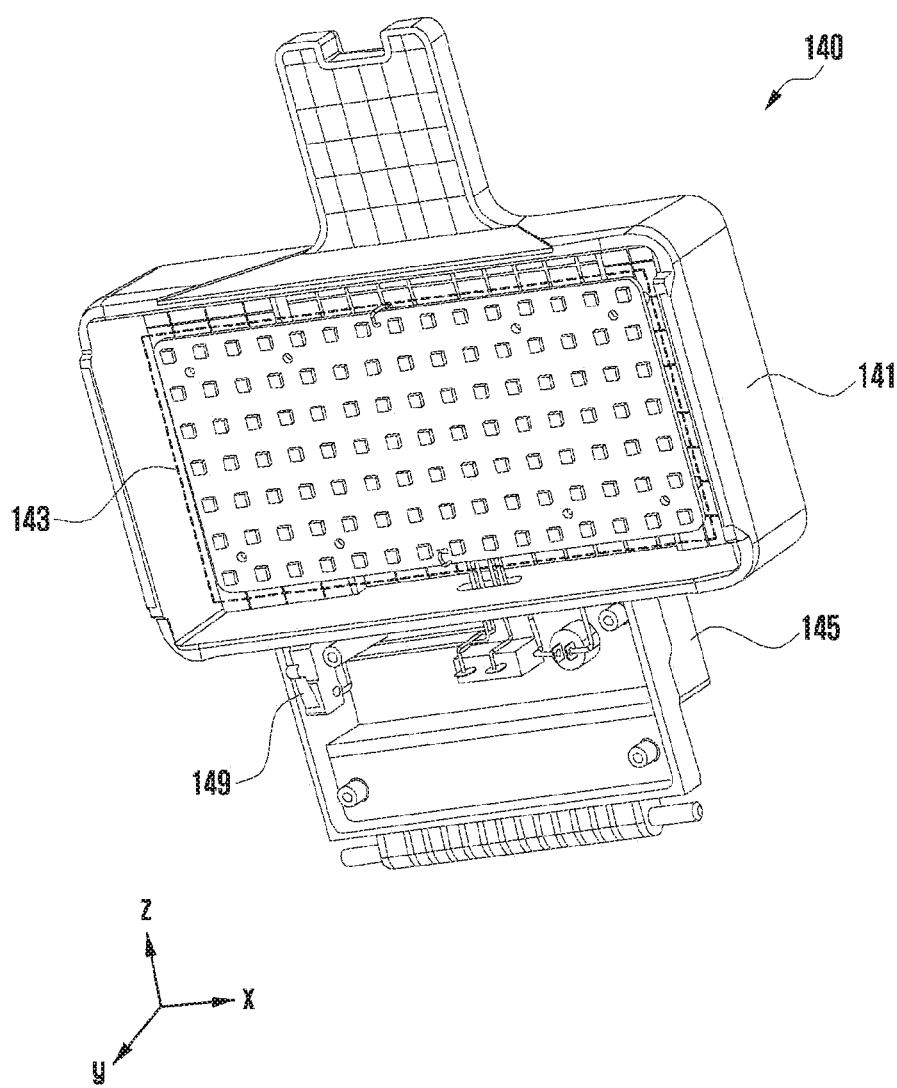
FIG. 7 is a view illustrating a curing unit according to an embodiment of the disclosure.

FIG. 7 is a view illustrating a curing unit 140 according to an embodiment of the disclosure.

The curing unit 140 according to an embodiment of the disclosure may include a lamp housing 141 and a power source housing 145. The lamp housing 141 may be formed to have a size corresponding to that of the seating portion 111 (see FIG. 3A) of the fixing tray 110 (see FIG. 3A), and may close or open the seating portion 111 of the fixing tray 110. When the seating portion 111 of the fixing tray 110 is in the closed state, it may mean the state in which the lamp housing 141 covers the seating portion 111 of the fixing tray 110, and when the fixing tray 110 is in the open state, it may mean the state in which the lamp housing 141 does not cover the seating portion 111 of the fixing tray 110. A light source 143 capable of emitting ultraviolet rays towards the seating portion 111 may be disposed inside the lamp housing 141. The lamp housing 141 may be formed such that ultraviolet rays generated from the light source 143 embedded therein do not leak therethrough.

The power source housing 145 according to an embodiment of the disclosure is formed to extend from one side of the lamp housing 141, and is coupled to the base 120 (see FIG. 4) via a hinge 129 so as to connect the base 120 and the lamp housing 141. A controller and a circuit board, which are electrically connected to a power source and control whether to supply power to the light source 143, may be disposed in the power source housing 145.

In the power source housing 145 according to an embodiment of the disclosure, a switch 149, which supplies power to the light source 143 when the lamp housing 141 closes the seating portion 111 and cuts off power to the light source 143 when the lamp housing 141 opens, may be provided. This makes it possible to prevent ultraviolet rays from leaking if the power is supplied to the light source 143 in the state in which the lamp housing 141 opens.

The controller according to an embodiment of the disclosure may be configured to cut off power after supplying the power to the light source 143 for a predetermined time in the state in which the lamp housing 141 is closed. The predetermined time may be a time required for curing the protective film.

The controller according to an embodiment of the disclosure may be configured to prevent the risk of a safety accident due to overheating by cutting off the power supplied to the light source 143 when the temperature inside the lamp housing 141 rises to be equal to or higher than a predetermined temperature, even if a predetermined time has not elapsed, in the state in which the lamp housing 141 is closed.

Figure 8A:
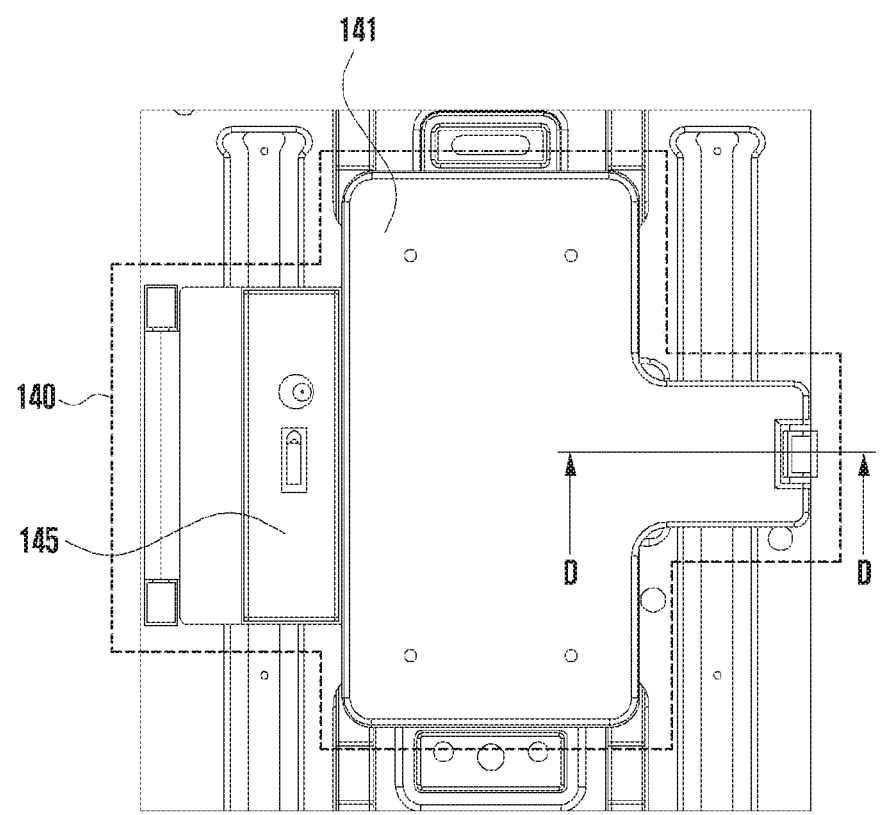
FIGS. 8A and 8B are views illustrating a locking device according to an embodiment of the disclosure.
Figure 8B:
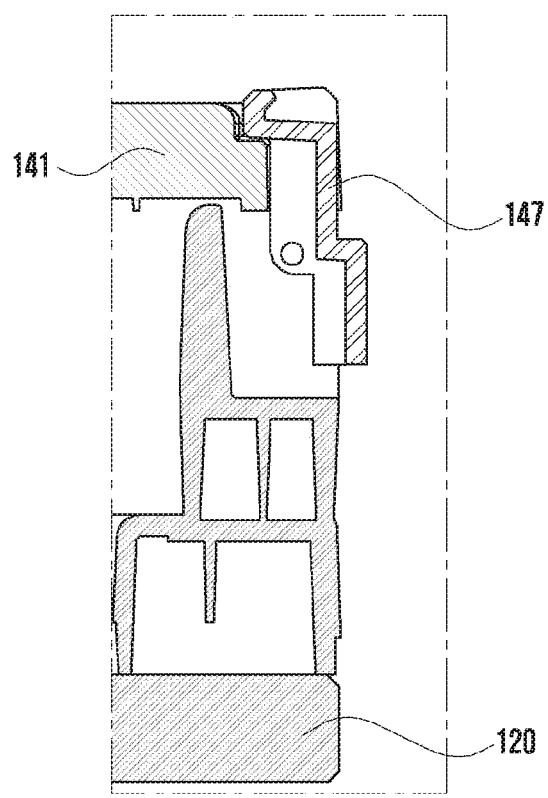

FIGS. 8A and 8B are views illustrating a locking device 147 according to an embodiment of the disclosure.

FIG. 8A is a plan view of a curing unit 140 according to an embodiment of the disclosure, and FIG. 8B is a cross-sectional view taken along line D-D in FIG. 8A.

In order to prevent the lamp housing 141 according to an embodiment of the disclosure from being opened in the process of emitting ultraviolet rays in the state in which the lamp housing 141 is closed so as to prevent ultraviolet rays from leaking, a locking device 147 may be disposed so as to maintain the closed state of the lamp housing 141, as illustrated in FIG. 8B.

FIG. 8B illustrates the case where the base 120 and the lamp housing 141 are physically engaged with each other, as an embodiment. However, the disclosure is not limited thereto, and any of various structures using, for example, a method using a magnetic body or electromagnetic force, may be applicable, as long as the lamp housing 141 can be prevented from being unintentionally opened.

A protective film attachment device 100 according to an embodiment of the disclosure may include: a fixing tray 110 including a seating portion 111 on which an electronic device 200 is seated; a base 120 including a coupling portion 121 so as to allow the fixing tray 110 to be attached to or detached from the base and one or more rails 123 disposed along a lengthwise direction or a widthwise direction of the coupling portion 121; a roller unit 130 configured to move along the one or more rails 123 and to press a surface of the electronic device 200 seated on the fixing tray 110; and a curing unit 140 coupled to the base 120 and configured to close or open the seating portion 111 of the fixing tray 110 and to emit ultraviolet rays towards the fixing tray 110.

The one or more rails 123 according to an embodiment may be disposed parallel to each other, with the coupling portion 121 interposed therebetween.

The fixing tray 110 according to an embodiment may further include a first fixing portion 113 and a second fixing portion 116 disposed, with the seating portion 111 interposed therebetween, wherein the first fixing portion 113 and the second fixing portion 116 protrude from a surface of the fixing tray 110 and fix the position of the protective film 300 relative to the seating portion 111.

The first fixing portion 113 according to an embodiment may include a first fixing base 114 formed to protrude from the surface of the fixing tray 110 and a first fixing protrusion 115 formed to protrude from the first fixing base 114, the second fixing portion 116 may include a second fixing base 117 formed to protrude from the surface of the fixing tray 110 and a second fixing protrusion 118 formed to protrude from the second fixing base 117, and the second fixing base 117 may have a protruding height higher than the protruding height of the first fixing base 114.

The first fixing protrusion 115 according to an embodiment may include two or more protrusions, and the second fixing protrusion 118 may include one or more protrusions.

The roller unit 130 according to an embodiment may include: a roller mount 124 configured to move along the one or more rails 123 and protruding from the base 120; a roller housing 133 detachably mounted on the roller mount 124 and having an open surface facing the base 120; a roller 135 embedded in the roller housing 133 and configured to move towards or away from the base 120; and a roller-pressing unit 137 embedded in the roller housing 133 so as to press the roller 135 towards the base.

The roller 135 according to an embodiment may include a shaft 135a coupled to the roller housing 133 and an elastic portion 135b surrounding the shaft 135a and configured to come into contact with the protective film 300, and the central portion of the roller 135 has a diameter smaller than that of opposite end portions of the roller 135. A change in diameter between the opposite end portions and the central portion based on the cross-sectional shape of the roller 135 corresponds to the surface shape of a cross section of the electronic device 200 cut in a lengthwise direction or a widthwise direction thereof.

The elastic portion 135b of the roller 135 according to an embodiment may be divided in the lengthwise direction of the shaft 135a and may be made of materials having different elastic moduli.

The roller-pressing unit 137 according to an embodiment is a spring or a cylinder.

The curing unit 140 according to an embodiment may include: a lamp housing 141 formed to correspond to a size of the seating portion 111 of the fixing tray 110 and having an open surface facing the electronic device 200, wherein a light source 143 configured to emit ultraviolet rays is disposed in the lamp housing 141 and transmission of the ultraviolet rays is blocked by the lamp housing 141; and a power source housing 145 extending from one side of the lamp housing 141 and including therein a controller electrically connected to a power source to control power supplied to the light source 143 and a circuit board on which the controller is mounted, wherein the power source housing 145 is coupled to the base 120.

The curing unit 140 according to an embodiment may further include a locking device 147 disposed on the other side of the lamp housing 141, wherein, when the lamp housing 141 closes the seating portion 111 of the fixing tray 110, the locking device may be coupled to the base 120 so as to prevent opening of the lamp housing 141.

A switch 149 may be disposed in the power source housing 145 according to an embodiment, wherein the switch 149 is configured to supply power to the light source 143 when the lamp housing 141 closes the seating portion 111 of the fixing tray 110 and to cut off power supplied to the light source 143 when the power source housing 145 is opened.

The controller according to an embodiment may be configured to perform control such that the power supplied to the light source 143 is cut off after a predetermined time elapses or when the temperature inside the lamp housing 141 reaches a predetermined temperature.

The base 120 according to an embodiment may include one or more first ridges 125 formed to protrude from the base 120 and disposed along the lengthwise direction of the fixing tray 110 to be parallel to each other in the widthwise direction of the fixing tray 110, with a place corresponding to the position of the first fixing portion 113 interposed therebetween, wherein the one or more first ridges 125 have a shape in which the degree of protrusion gradually increases and then decreases again along the lengthwise direction of the fixing tray 110.

The maximum degree of protrusion of the first ridges 125 corresponds to the degree of protrusion of the first fixing portion 113.

The base 120 according to an embodiment may include one or more second ridges 127 formed to protrude from the base 120 and disposed along the lengthwise direction of the fixing tray 110 to be parallel to each other in the widthwise direction of the fixing tray 110, with a place corresponding to the position of the second fixing portion 116 interposed therebetween, wherein the one or more second ridges 127 have a shape in which the degree of protrusion gradually increases along the lengthwise direction of the fixing tray 110.

A protective film attachment device 100 according to an embodiment of the disclosure may include: a fixing tray 110 including a seating portion 111 configured to seat an electronic device 200 having a curved surface thereon and at least one fixing portion for fixing a protective film 300 to be attached to the electronic device 200; a base 120 including a coupling portion 121 so as to allow the fixing tray 110 to be attached to or detached from the base 120 and one or more rails 123 disposed along a lengthwise direction or a widthwise direction of the fixing tray 110; a roller unit 130 configured to move along the one or more rails 123 and to apply pressure so as to attach the protective film 300 to the electronic device 200 seated on the fixing tray 110; and a curing unit 140 hinged to the base 120 and configured to close or open the seating portion 111 of the fixing tray 110 and to emit ultraviolet rays towards the fixing tray 110.

Figure 9:
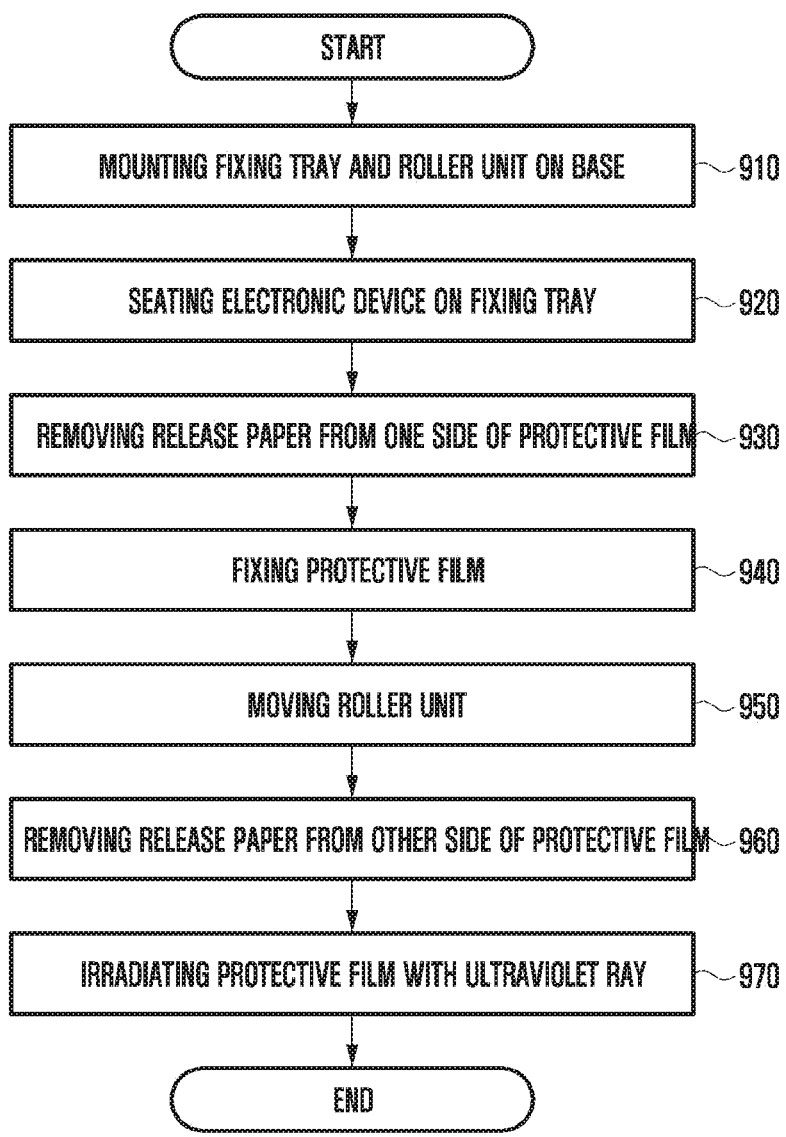
FIG. 9 is a flowchart illustrating operations in a protective film attachment method according to an embodiment of the disclosure.

FIG. 9 is a flowchart illustrating operations in a protective film attachment method according to an embodiment of the disclosure.

A method of attaching the protective film 300 (see FIG. 3B) using the protective film attachment device 100 (see FIG. 1) according to an embodiment of the disclosure is as follows. In operation 910, a fixing tray 110 (see FIG. 3A) and a roller unit 130 (see FIG. 5A) corresponding to an electronic device 200 (see FIG. 3A) to which a protective film 300 is to be attached are selected and coupled to the base.

In operation 920, the electronic device 200 may be seated on the fixing tray 110. For example, the electronic device 200 may be seated such that the upper end portion 210 (see FIG. 3A), in which a structure exposed to the front surface of the electronic device 200, such as a receiver hole or a front camera, is located, faces the first fixing portion 113 (see FIG. 3A). In operation 930, a release paper 301 (see FIG. 3B) on one side of the protective film 300 may be removed. In operation 940, the protective film 300, from which the release paper 301 on one side thereof has been removed, may be fixed to the first fixing portion 113 and the second fixing portion 116 (see FIG. 3A) such that the surface from which the release paper has been removed faces the surface of the electronic device 200. In operation 940, the relative positional relationship between the protective film 300 and the surface of the electronic device 200 to which the protective film is to be attached may be fixed.

In operation 950, the roller unit 130 may be moved along the rails 123 (see FIG. 4) of the base 120 (see FIG. 4). While the roller unit 130 is moved, the roller 135 (see FIG. 5B) may uniformly press the protective film 300 against the surface of the electronic device 200 such that the protective film 300 can be uniformly attached to the surface of the electronic device 200. However, the roller unit 130 may be reciprocated multiple times between the first fixing portion 113 and the second fixing portion 116 along the rails 123 in order to more reliably attach the protective film 300 to the surface of the electronic device 200.

In operation 960, the attachment of the protective film may be completed by releasing the release paper 302 (see FIG. 3B) of the other side of the protective film 300.

In operation 970, the lamp housing 141 (see FIG. 7) is closed in the state in which the electronic device 200, on which the attachment of the protective film has been completed, is seated on the seating portion 111 (see, FIG. 3A), and ultraviolet rays may be emitted. The protective film irradiated with ultraviolet rays is cured, so that the attachment state of the protective film, deformed to correspond to the variously curved shape of the surface of the electronic device, can be maintained.

FIGS. 10A to 10E are views illustrating operations for attaching a protective film 300 according to an embodiment of the disclosure.

Figure 10A:
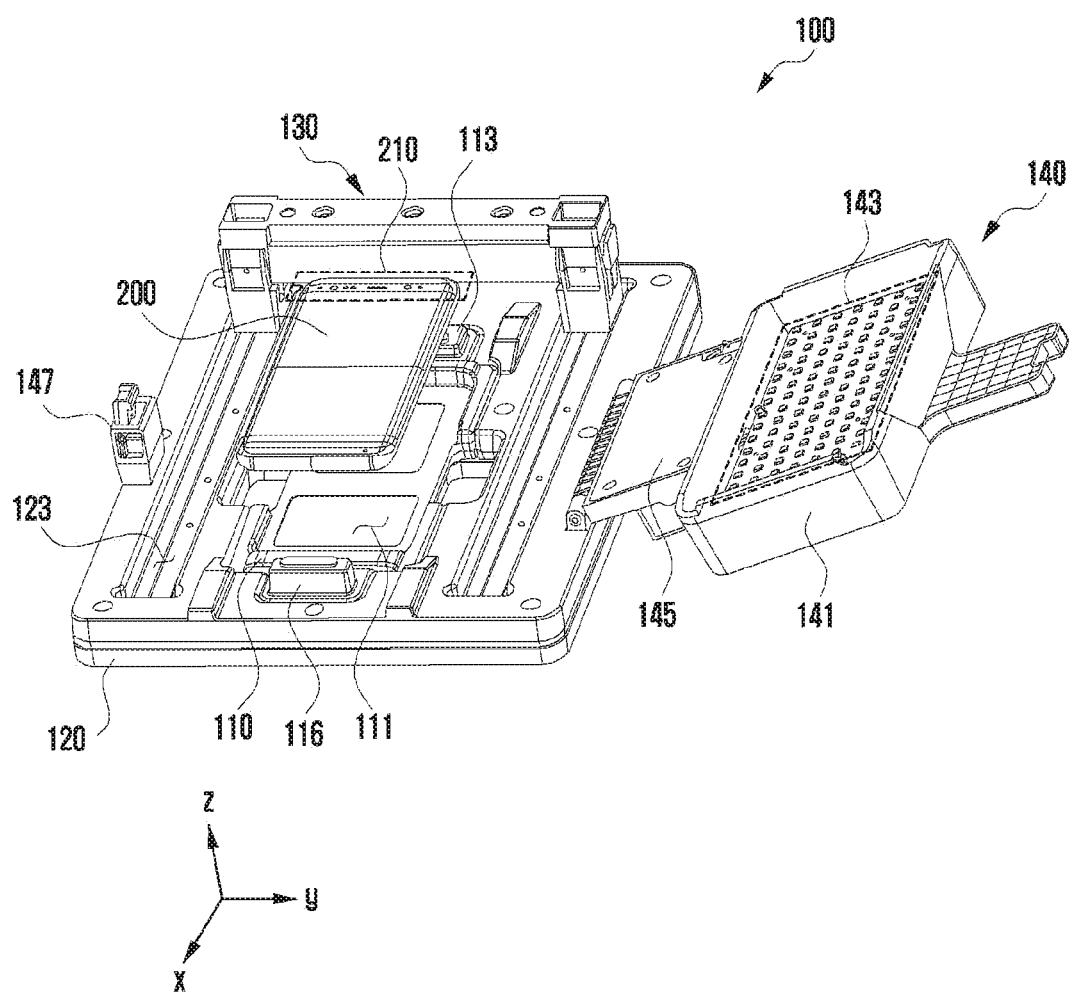
FIGS. 10A to 10E are views illustrating operations for attaching a protective film according to an embodiment of the disclosure.

FIG. 10A may illustrate the state in which the fixing tray 110 and the roller unit 130 are coupled to the base 120 according to an embodiment of the disclosure. The electronic device 200 may be seated on the seating portion 111 of the fixing tray 110 such that the upper end portion 210 thereof faces the first fixing portion 113.

Figure 10B:
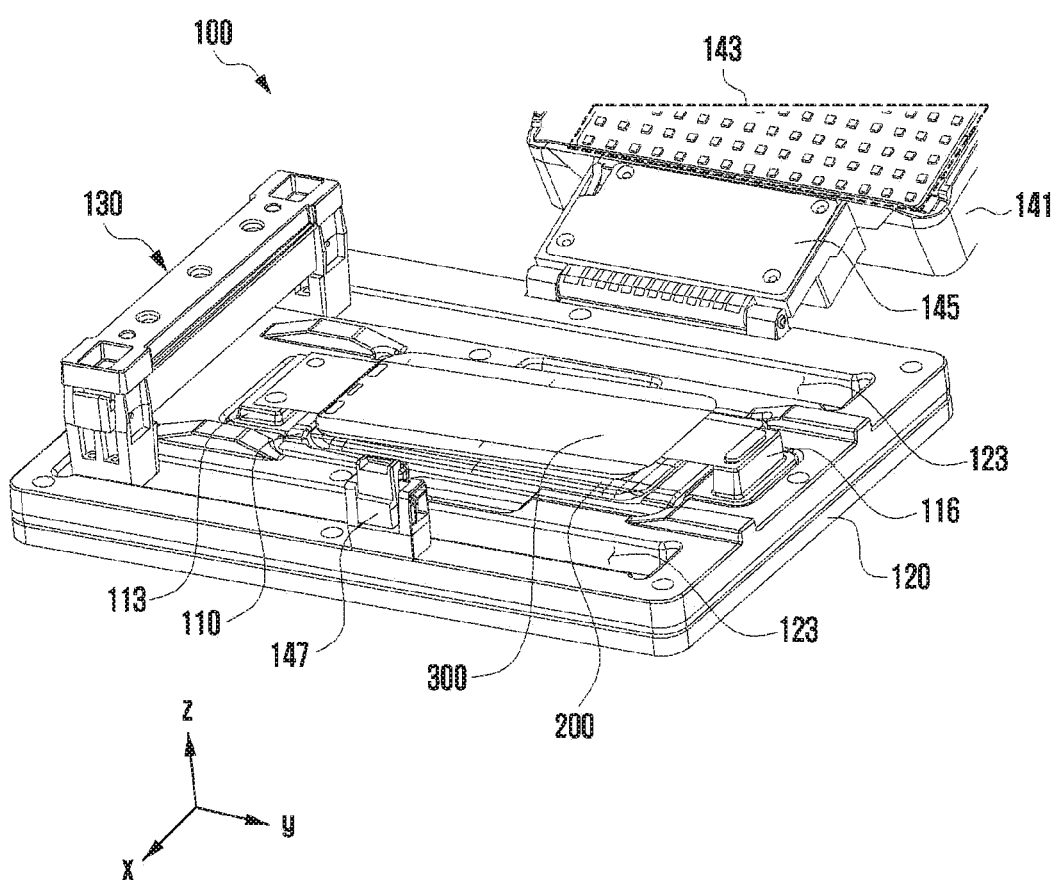

FIG. 10B may illustrate the state in which the protective film 300 is fixed to the first fixing portion 113 and the second fixing portion 116 of the fixing tray 110 according to an embodiment of the disclosure. The first fixing portion 113 may be formed lower than the second fixing portion 116, so that the distance between the protective film 300 and the surface of the electronic device 200 may be small.

Figure 10C:
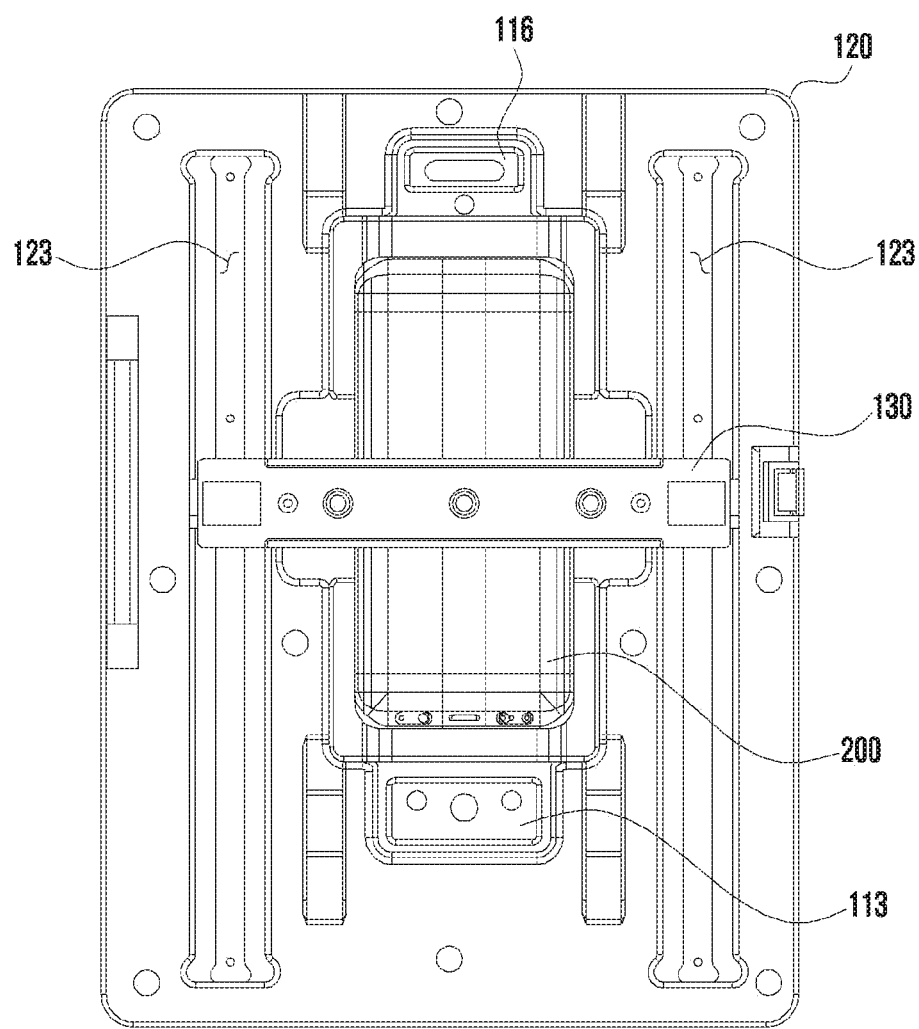

FIG. 10C may represent an operation in which the roller unit 130 according to an embodiment of the disclosure reciprocates along the rails 123 while pressing the protective film 300 onto the surface of the electronic device 200. In this operation, the roller unit 130 may uniformly apply pressure along the shape of the surface of the electronic device 200.

Figure 10D:
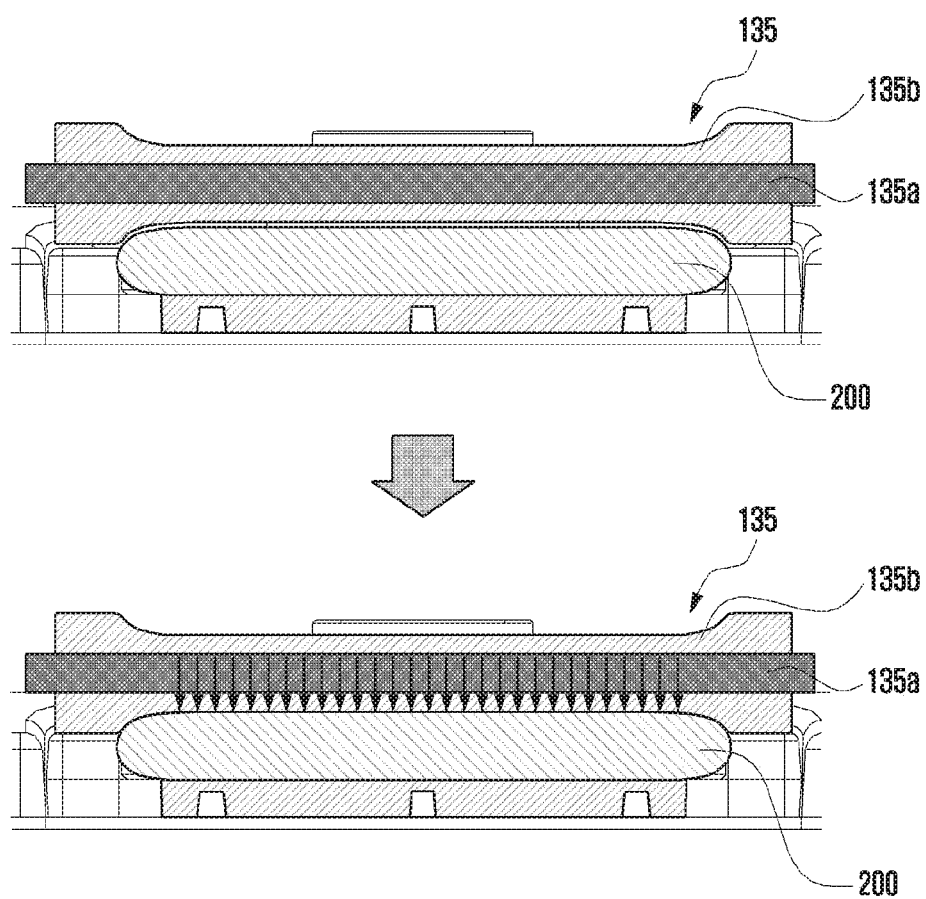

FIG. 10D is a cross-sectional view illustrating an operation in which the roller unit 130 presses the surface of the electronic device 200 according to the operation of FIG. 10C. As described above, the shape of the elastic portion 135b of the roller 135 is formed to correspond to the cross-sectional shape of the electronic device 200, and when force is applied through the shaft 135a, pressure is uniformly applied to the surface of the electronic device 200.

Figure 10E:
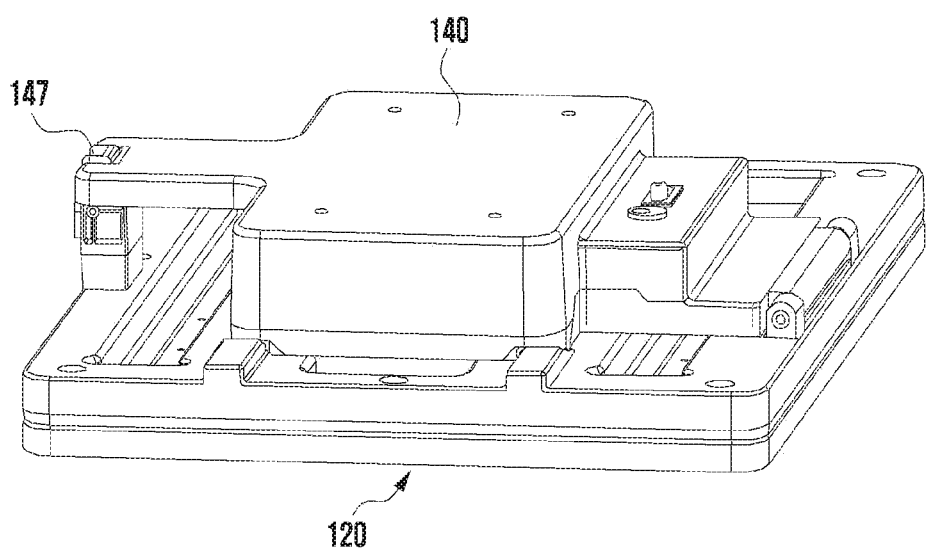

FIG. 10E may represent an operation in which the electronic device 200, to which the protective film 300 according to an embodiment of the disclosure is attached, is irradiated with ultraviolet rays so as to cure the protective film 300. The curing unit 140 may be maintained in the state in which the lamp housing 141 is closed using the locking device 147 in order to prevent leakage of ultraviolet rays if the lamp housing 141 is opened while emitting ultraviolet rays.

A protective film attachment method according to an embodiment of the disclosure may include operations of: coupling the fixing tray 110 to the coupling portion 121 of the base 120 (910); coupling the roller unit 130 to the base 120 (910); seating an electronic device 200 on the fixing tray 110 (920); removing a release paper from one side of the protective film 300 (930); fixing the protective film to the first fixing portion 113 and the second fixing portion 116 in the state in which the one side of the protective film 300, from which the release paper has been removed, faces the electronic device 200 (940); moving the roller unit 130 along the rails 123 of the base 120 (950); removing a release paper from the other side of the protective film 300 (960); and irradiating the protective film 300 with ultraviolet rays through the curing unit 140 (970).

In the protective film attachment method according to an embodiment, in the operation of seating the electronic device 200 on the fixing tray 110, the electronic device 200 is seated such that the upper end portion 210 of the electronic device 200 is located at the first fixing portion 113 side.

In the protective film attachment method according to an embodiment, in the operation of moving the roller unit 130 along the rails 123 of the base 120, the roller unit 130 is reciprocated multiple times along the rails 123 of the base unit 120.

The invention claimed is:

1. A device for attaching a protective film, the device comprising:
   a fixing tray including:
      a seating portion on which an electronic device is seated; and
      a first fixing portion and a second fixing portion disposed with the seating portion interposed therebetween, wherein the first fixing portion and the second fixing portion protrude from a surface of the fixing tray and fix a position of the protective film relative to the seating portion;
   a base including a coupling portion so as to allow the fixing tray to be attached to or detached from the base and one or more rails disposed along a lengthwise direction or a widthwise direction of the coupling portion;
   a roller assembly configured to move along the one or more rails and to press a surface of the electronic device seated on the fixing tray; and
   a curing assembly coupled to the base and configured to close or open the seating portion of the fixing tray, the curing assembly comprising a light source configured to emit ultraviolet rays towards the fixing tray,
   wherein the first fixing portion includes a first fixing base formed to protrude from the surface of the fixing tray and a first fixing protrusion formed to protrude from the first fixing base,
   wherein the second fixing portion includes a second fixing base formed to protrude from the surface of the fixing tray and a second fixing protrusion formed to protrude from the second fixing base, and
   wherein the second fixing base has a protruding height higher than a protruding height of the first fixing base.

2. The device of claim 1, wherein the one or more rails are disposed parallel to each other, with the coupling portion interposed therebetween.

3. The device of claim 1, wherein the first fixing protrusion includes two or more protrusions, and the second fixing protrusion includes one or more protrusions.

4. The device of claim 1, wherein the roller assembly includes:
   a roller mount configured to move along the one or more rails and protruding from the base;
   a roller housing detachably mounted on the roller mount and having an open surface facing the base;
   a roller embedded in the roller housing and configured to move towards or away from the base; and
   a roller-pressing assembly embedded in the roller housing so as to press the roller towards the base.

5. The device of claim 4,
- wherein the roller includes a shaft coupled to the roller housing and an elastic portion surrounding the shaft and configured to come into contact with the protective film, and
- wherein a central portion of the roller has a diameter smaller than a diameter of opposite end portions of the roller, a change in diameter between the opposite end portions and the central portion based on a cross-sectional shape of the roller corresponds to a surface shape of a cross section of the electronic device cut in a lengthwise direction or a widthwise direction thereof.

6. The device of claim 5, wherein the elastic portion of the roller is divided in a lengthwise direction of the shaft and is made of materials having different elastic moduli.

7. The device of claim 1, wherein the curing assembly includes:
- a lamp housing formed to correspond to a size of the seating portion of the fixing tray and having an open surface facing the electronic device,
- wherein the light source configured to emit ultraviolet rays is disposed in the lamp housing and transmission of the ultraviolet rays is blocked by the lamp housing; and
- a power source housing extending from one side of the lamp housing and including therein a controller electrically connected to a power source to control power supplied to the light source and a circuit board on which the controller is mounted, wherein the power source housing is coupled to the base.

8. The device of claim 7, wherein the curing assembly further includes:
- a locking device disposed on a remaining side of the lamp housing, wherein, when the lamp housing closes the seating portion of the fixing tray, the locking device is coupled to the base so as to prevent opening of the lamp housing.

9. The device of claim 7, further comprising:
- a switch disposed in the power source housing, wherein the switch is configured to supply power to the light source when the lamp housing closes the seating portion of the fixing tray and to cut off power supplied to the light source when the power source housing is opened.

10. The device of claim 9, wherein the controller is configured to perform control such that the power supplied to the light source is cut off after a predetermined time elapses or a temperature inside the lamp housing reaches a predetermined temperature.

11. The device of claim 1,
- wherein the base includes one or more first fixing portion ridges formed to protrude from the base and disposed along a lengthwise direction of the fixing tray to be parallel to each other in a widthwise direction of the fixing tray, with a place corresponding to a position of the first fixing portion interposed therebetween,
- wherein the one or more first fixing portion ridges have a shape in which a degree of protrusion gradually increases and then decreases again along the lengthwise direction of the fixing tray.

12. The device of claim 11, wherein a maximum degree of protrusion of the first fixing portion ridges corresponds to a degree of protrusion of the first fixing portion.

13. The device of claim 1,
- wherein the base includes one or more second fixing portion ridges formed to protrude from the base and disposed along a lengthwise direction of the fixing tray to be parallel to each other in a widthwise direction of the fixing tray, with a place corresponding to a position of the second fixing portion interposed therebetween,
- wherein the one or more second fixing portion ridges have a shape in which a degree of protrusion gradually increases along the lengthwise direction of the fixing tray.

14. The device of claim 13, wherein a maximum degree of protrusion of the second fixing portion ridges corresponds to a degree of protrusion of the second fixing portion.

* * * * *